United States Patent [19]

Fischbach et al.

[11] Patent Number: 4,925,683

[45] Date of Patent: May 15, 1990

[54] BEVERAGE CAPSULES

[75] Inventors: Eugene R. Fischbach, Fulton; Stephen J. Destephen, Oswego, both of N.Y.

[73] Assignee: Nestec S.A., Vevey, Switzerland

[21] Appl. No.: 396,737

[22] Filed: Aug. 18, 1989

Related U.S. Application Data

[63] Continuation of Ser. No. 131,205, Dec. 10, 1987, abandoned.

[51] Int. Cl.$^5$ .......................... A23L 2/00; A23G 3/00
[52] U.S. Cl. ........................................ 426/103; 426/89; 426/572; 426/590; 426/593; 426/594; 426/658
[58] Field of Search ................. 426/89, 103, 572, 590, 426/660, 593, 571, 650, 994, 658

[56] References Cited

U.S. PATENT DOCUMENTS 3,958,024  5/1976  Fissolo ............................... 426/103
4,410,552 10/1983  Gaffney et al. ..................... 426/103

FOREIGN PATENT DOCUMENTS 1442282 of 1966 France .

OTHER PUBLICATIONS

Translation of French Patent No. 1442282 Deregnaucourt, "Specially Produced Sugar Covering Various Soluble Food Ingredients".

*Primary Examiner*—Marianne Cintins
*Attorney, Agent, or Firm*—Vogt & O'Donnell

[57] ABSTRACT

A beverage capsule in which a beverage base is enclosed in a thin walled solid envelope made of chocolate or a fat-based confectionery coating.

14 Claims, No Drawings

BEVERAGE CAPSULES

This application is a continuation of application Ser. No. 131,205 filed 12/10/87; now abandoned.

BACKGROUND OF THE DISCLOSURE

The present invention relates to beverage capsules, more especially to beverage capsules in which the beverage base is enclosed in a thin walled solid envelope made of chocolate or a fat-based confectionery coating.

There is a desire for beverage capsules, which are to be mixed with hot milk or water for consumption, which contain real chocolate.

Beverage mixtures are known in which chocolate powder is mixed with a beverage powder such as cocoa, but these products suffer from the disadvantages that the presence of chocolate is not self-evident before dissolution.

French Patent No. 1442282 describes a food product comprising beverage powders surrounded by an envelope of sugar, which enables the taking of two different products in a single operation and their instantaneous dissolution together.

SUMMARY OF THE INVENTION

The present invention provides a beverage capsule in which a beverage base is enclosed in a thin-walled solid envelope made of a fatbased confectionery coating or of chocolate.

We have found that the use of chocolate as the envelope by a beverage base provides a means of introducing a large quantity of "real chocolate" with enhanced melting characteristics into hot milk or water by virtue of having its surface area maximised as a thin shelled coating.

Moreover, if the beverage base is used in a water-based liquid or syrup form, a chocolate envelope or any envelope of confectionery material having a continuous phase of fat serves as a water barrier and as a means of delivering a complete single serving dose of syrup. In contrast, if a sugar envelope were used to hold a liquid, it would be necessary for the water phase of the liquid to be saturated with sugar to maintain the integrity of the sugar shell and prevent the liquid from redissolving the sugar shell; this requirement is not necessary when using a fat-based envelope such as chocolate since it resists moisture transfer. Finally, such a product comprising a beverage base surrounded by a chocolate shell may also be consumed out-of-hand.

DETAILED DESCRIPTION OF THE INVENTION

The beverage base may be, for example, cocoa, hot cocoa mix, coffee, chocolate syrup or various substitutes or any mixture thereof. The beverage base may be in liquid, syrup, semi-solid or solid form. The liquid or syrup may be conventional and may be water-based, e.g., containing from 17 to 27% water, or it may be fat-based. The solid may be a powder, compressed cake of powder or a dried out sponge.

The solid envelope may be made of any kind of coating with fat as the continuous phase, for example, milk or dark chocolate or compound coatings containing vegetable fats or various substitutes such as direct cocoa butter replacements, stearines, coconut oil, palm oil, butter or any mixture thereof. The solid envelope may be made by any conventional technique, for example, by a moulding process. If a solid centre is used, the solid envelope may be enrobable or panned. The thickness of the envelope may be from 0.5 mm to 5.0 mm, preferably from 0.7 mm to 4.0 mm and especially from 2.0 mm to 3.0 mm. The shape of the chocolate envelope may vary and may, for instance, be tubular, disc-shaped or spherical depending on the application.

If desired, various flavours may be added either to the beverage base or to the solid envelope. Since the product may have both an oil and a water component, any flavour that is dispersible in either of these can be added.

The amount of beverage base and the size of the chocolate envelope may vary widely according to the requirements. For instance, the amount of beverage base may be from 1 to 50 g, preferably from 1.5 to 40 g and especially from 2 to 35 g, while the weight of the chocolate envelope may be from 3 g to 50 g, preferably from 3.5 g to 40 g and especially from 4 g to 30 g.

The beverage capsule of the present invention may be prepared for consumption by mixing with a hot liquid. Although the temperature of the hot liquid may be as low as 40° C., it is preferable that the temperature is at least 75° C. Any consumable liquid that can be safely heated to at least 75° C. can be used as the liquid medium, for example, coffee or tea, but milk or water are most appropriate. A preferred method of preparing the beverage capsule for consumption is by adding one or more beverage capsules to cold liquid and then putting in a microwave oven at full power for about 1.5 minutes.

The beverage capsule according to this invention provides a unique means of showing that a beverage product contains real chocolate.

EXAMPLES

The following Examples further illustrate the present invention.

EXAMPLE 1

A water-based chocolate syrup was prepared having the following constitution:

| Ingredients | % |
| --- | --- |
| High Fructose Corn Syrup (42% Fructose) | 36.22 |
| Water | 17.31 |
| Sucrose | 35.10 |
| Alkalized cocoa | 10.73 |
| Xanthan Gum | 0.20 |
| Salt | 0.21 |
| Citric acid | 0.22 |
| Potassium sorbate | 0.11 |
| | 100.00 |

The syrup was prepared as follows:

1. A premix was made out of salt, citric acid and potassium sorbate.
2. 10% of the sucrose and xanthan gum were mixed and added to the water with agitation.
3. The high fructose corn syrup was added to the aqueous mixture and mixed.
4. The cocoa was added to the aqueous mixture and stirred until fully dispersed.
5. The remaining ingredients, sugar and premix were added to the mixture.
6. After all the ingredients had been blended, the mixture was pasteurised at 86° C. for 40 secs.

7. The water lost during heating was measured and replaced with fresh water.

8. The syrup formed was then homogenised, cooled and stored in appropriate containers until used.

Tempered dark chocolate was poured into a candy mould which was then inverted and cooled to produce a thin chocolate shell. When sufficiently hardened, 7.4 grams of the water based chocolate syrup prepared as above was poured into the mould and then the mould was capped with chocolate to complete the shell container and form the capsule. The final weight of chocolate added was 4.2 grams.

One adding two of these capsules to 120 grams of hot milk the capsules rapidly dispersed to give a tasty drink. The product also tasted good eaten out of the hand.

EXAMPLE 2

A similar procedure to that described in Example 1 was carried out but using 10 g of a milk chocolate to form the chocolate envelope and 16 g of a cherry flavoured chocolate syrup for the center.

On adding one of these capsules to 150 g of hot milk, the beverage capsule rapidly dispersed to give a tasty drink.

EXAMPLE 3

A mint flavoured product was prepared by following a similar procedure to that described in Example 1 but using 4.3 g of a chocolate-mint flavoured coating to form the envelope and 7.4 g of a chocolate syrup for the center.

On adding two of these capsules to 120 g of hot milk, the capsules rapidly dispersed to give a tasty chocolate-mint flavoured drink. The product also tasted good upon eating out of hand.

EXAMPLE 4

Tempered milk chocolate was poured into a candy mould which was then inverted to produce a thin layer of chocolate weighing 20 g in the mould during room temperature cooling. When sufficiently hardened 35 g of hot cocoa mix powder was filled into the mould and then the mould was capped with chocolate to complete the shell container.

On adding to 170 g of hot water the beverage capsule rapidly dispersed to give a tasty drink.

EXAMPLE 5

A similar procedure to that described in Example 4 was carried out but using 21 g of a dark chocolate to form the chocolate envelope and 23 g of cherry flavoured hot cocoa mix powder for the centre.

On adding to 200 g of hot milk, the beverage capsule rapidly dispersed to give a tasty drink.

EXAMPLE 6

A Mocha flavoured product was prepared by following a similar procedure to that described in Example 4 but using 9 g of a dark chocolate to form the chocolate envelope and 2 g of instant coffee for the centre.

On adding to 170 g of hot water, the beverage capsule rapidly dispersed to give a tasty Mocha flavoured drink.

We claim:

1. A composition for preparation of a beverage consisting essentially of a beverage base selected from a group consisting of a liquid and a syrup beverage base enveloped and contained in a shell coating consisting essentially of a continuous phase of fat of a fat-based confectionery material having a thickness of from 0.5 mm to 5 mm and wherein the composition of the beverage base is not saturated with sugar.

2. A composition according to claim 1 wherein the fat-based confectionery material is chocolate.

3. A composition according to claim 1 wherein the beverage base is water-based and contains from 17% to 27% water.

4. A composition according to claim 1 wherein the beverage base is in an amount of from 1 g to 50 g and wherein the coating is in an amount of from 3 g to 50 g.

5. A composition according to claim 4 wherein the beverage base is in an amount of from 1.5 g to 40 g and the coating is in an amount of from 3.5 g to 40 g.

6. A composition according to claim 1 wherein the fat-based confectionery material contains vegetable fat.

7. A composition according to claim 1 wherein the fat of the fat-based confectionery material is selected from a group consisting of stearines, coconut oil, palm oil, butter fat and combinations thereof.

8. A process for preparing a beverage comprising adding a beverage capsule to and mixing it with a consumable hot liquid wherein the capsule is comprised of a beverage base selected from a group consisting of a liquid and a syrup beverage base enveloped and contained in a shell coating consisting essentially of a continuous phase of fat of a fat-based confectionery material and wherein the composition of the beverage base is not saturated with sugar.

9. A process according to claim 8 wherein the fat-based confectionery material is chocolate.

10. A process according to claim 8 further comprising heating the beverage capsule and consumable liquid after adding the capsule to the liquid.

11. A process according to claim 10 wherein the capsule and liquid are heated to at least 75° C.

12. A process according to claim 8 wherein the consumable liquid to which the beverage capsule is added is at a temperature of at least 40° C.

13. A process according to claim 8 wherein the shell coating has a thickness of from 0.5 mm and 5 mm.

14. A process according to claim 8 wherein the beverage base is water-based and contains from 17% to 27% water.

* * * * *

UNITED STATES PATENT AND TRADEMARK OFFICE
CERTIFICATE OF CORRECTION

PATENT NO. : 4,925,683
DATED : May 15, 1990
INVENTOR(S) : Eugene Raymond FISCHBACH, et al.

It is certified that error appears in the above-identified patent and that said Letters Patent is hereby corrected as shown below:

Column 1, line 7, "BACKGROUND OF THE DISCLOSURE" should be --BACKGROUND OF THE INVENTION--.

Column 1, line 29, "fatbased" should be --fat-based--.

Column 4, line 49 (claim 11, line 1) "10" should be --8--.

Signed and Sealed this

Twenty-third Day of July, 1991

Attest:

HARRY F. MANBECK, JR.

Attesting Officer      Commissioner of Patents and Trademarks